H. GOLDSMITH AND J. T. FUNDA.
ATTACHMENT FOR WIND SHIELDS.
APPLICATION FILED JUNE 1, 1918.
1,307,491.
Patented June 24, 1919.
2 SHEETS—SHEET 2.
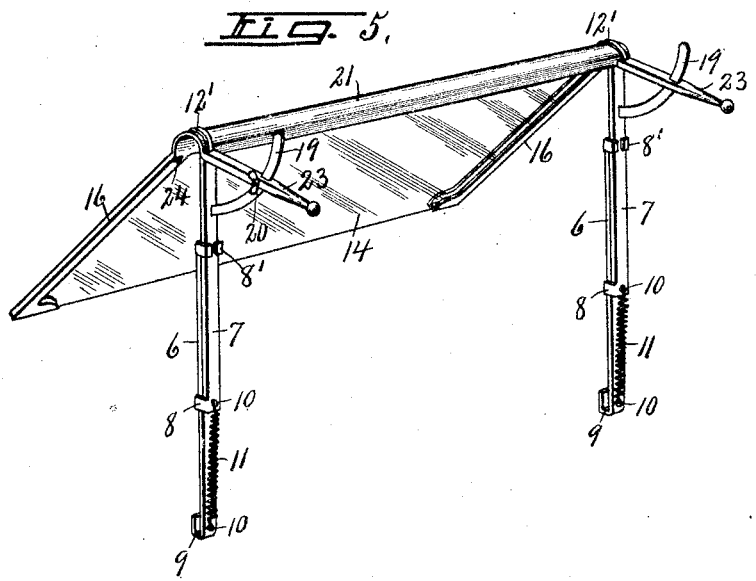
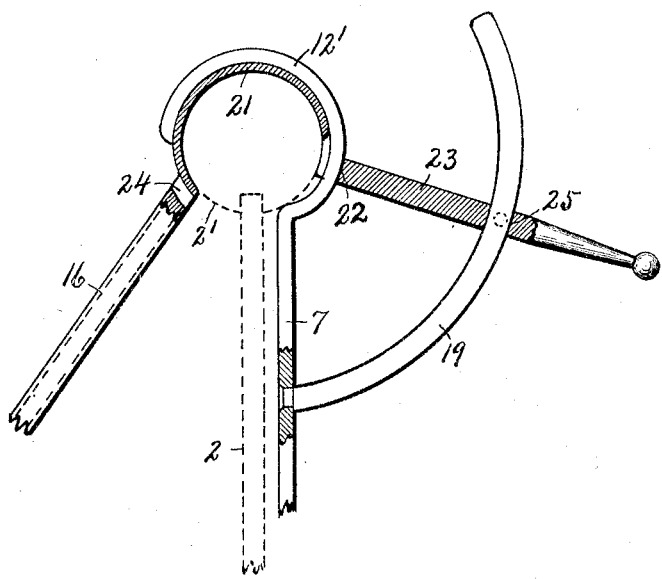
INVENTORS
H. Goldsmith and
J. T. Funda
BY
Howard P. Denison
ATTORNEY

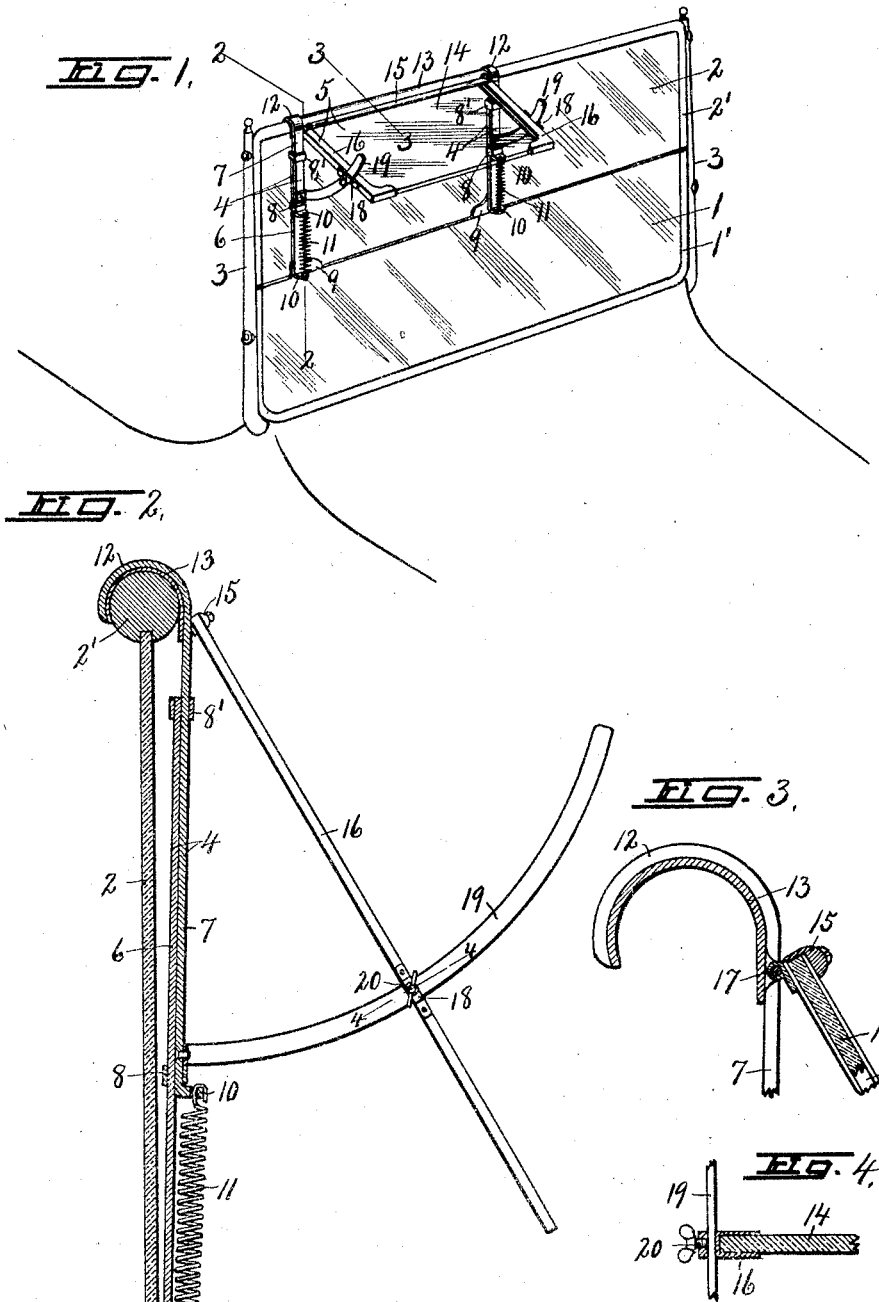

UNITED STATES PATENT OFFICE.

HARRY GOLDSMITH AND JOHN T. FUNDA, OF SYRACUSE, NEW YORK.

ATTACHMENT FOR WIND-SHIELDS.

1,307,491. Specification of Letters Patent. Patented June 24, 1919.

Application filed June 1, 1918. Serial No. 237,693.

*To all whom it may concern:*

Be it known that we, HARRY GOLDSMITH and JOHN T. FUNDA, citizens of the United States of America, and residents of Syracuse, in the county of Onondaga, in the State of New York, have invented new and useful Improvements in Attachments for Wind-Shields, of which the following, taken in connection with the accompanying drawings, is a full, clear, and exact description.

This invention relates to an attachment for wind-shields and constitutes what may be termed a supplemental shield as distinguished from the main shield.

The primary object is to prevent the accumulation of moisture, snow and ice upon the main shield so as to afford a clear vision therethrough when closed.

The specific object is to enable the supplemental shield to be easily and quickly attached to or detached from any of the main shields now in common use without in any way altering the construction thereof or removal of any of the parts thereof.

Another object is to enable the supplemental shield to be tilted to different positions from the seat of the driver and to provide suitable means for holding it in its adjusted position.

Other objects and uses relating to specific parts of the attachment will be brought out in the following description.

In the drawings—

Figure —1— is a perspective view of one form of our invention and the main wind-shield to which it is applied.

Fig. —2— is an enlarged transverse vertical sectional view taken on line 2—2, Fig. —1—.

Fig. —3— is a still further enlarged sectional view taken on line 3—3, Fig. —1—.

Fig. —4— is a detailed sectional view taken on line 4—4, Fig. —2—.

Fig. —5— is a perspective view of a slightly modified form of our invention, detached from the main shield.

Fig. —6— is an enlarged detailed section view through the upper portion of one end of the device shown in Fig. —5—.

The main shield shown in Figs. —1— and —2— comprises the usual lower and upper glass plates —1— and —2— mounted respectively in separate frames —1'— and —2'— which in turn are pivotally mounted in opposite upright side arms or brackets —3— to swing about horizontal parallel axes independently of each other, the frame for the lower plate being extended along the lower edge thereof while the frame of the upper plate extends along the upper edge and forms a supporting rail for the attachment carrying the supplemental shield.

This attachment comprises a pair of upright bars —4— spaced some distance apart in parallelism to receive between them a supplemental shield —5—, each bar being composed of sections —6— and —7— slidable vertically one upon the other and held in operative relation by clips —8— and —8'— on the upper end of the bar —6— and lower end of the bar —7—.

The lower end of each bar —6— is provided with a hook shaped inturned flange or jaw —9— for detachable interlocking engagement with the lower edge of the upper plate —2—, the lower ends of both members —6— and —7— being provided with outturned apertured flanges —10— for receiving opposite ends of a coil spring —11—.

The upper ends of the members —7— of both of the upright bars —4— are also hook shaped to form jaws —12— and are connected by a rigid concavo-convex bar —13— which together with the upright bars —4— constitute the supporting frame for the shield —5—.

This bar —13— is fitted and rests upon the top rail of the upper wind-shield frame —2'— and together with the bars —4— and supplemental wind-shield —5— may be moved along and upon the main shield to different positions as may be desired by the driver.

The springs —11— serve to yieldingly hold the upper bar —13— and flanges —9— in engagement with the upper and lower edges of the upper wind-shield section —2— and its supporting frame —2'— against accidental displacement and also permits those parts with the supplemental shield thereon to be easily and quickly removed or replaced at will.

The supplemental shield comprises a glass plate —14— and a suitable supporting frame therefor consisting of an upper bar —15— and side bars —16— in which the glass plate —14— is permanently secured.

The upper portion of the supporting frame for the supplemental shield is pivoted at —17— to the bar —13— between the upright bars —4—, the side bars of rails —16— being provided near their free ends with guide clips —18— for receiving curved arms or braces —19— which are concentric with axis of the pivot —17— and are secured at their rear ends to the members —7— of the uprights —4— to guide the supplemental wind-shield in its rocking movement and to permit it to be held in its adjusted position by clamping screws —20— in the clips —18— as shown more clearly in Figs. —2— and —4—.

In order to remove the supplemental wind-shield and its supporting frame from the main shield, it is simply necessary to slide the members —6— and —7— one upon the other against the action of the retracting springs —11— until the hook shaped portions —9— and —13— are free from engagement with the lower edge of the plate —2— and top rail of the frame —2'—.

The supplemental shield or attachment shown in Figs. —5— and —6— is similar to that shown in Figs. —1— and —2— except that the upper ends of the side rails —16— for the glass plate —14— are connected by a lengthwise bar —21— of concavo-convex cross-section adapted to fit and to turn upon the top rail —2—.

The upper ends of the members —7— are bent in the form of circular bearings —12'— extending through slots —22— in rearwardly projecting handles —23— and fitting upon the periphery of the lengthwise bar —21— to hold the latter in operative engagement with the periphery of the top rail —2'—, the circular ends at —12'— being of slightly greater length than half the circumference of the bar —2'— to prevent their displacement therefrom and at the same time permitting the supplemental wind-shield to rock freely therein.

The upper ends of the side rails —16— are slotted at —24— to permit the ends of the circular portions —12'— to enter therein when the shield is rocked to its substantially horizontal position or above such position.

The handles —23— are rigidly secured to opposite ends of the bar —21— and extend rearwardly to a point within easy reaching distance of the driver and are provided with slots —25— for receiving the circular guides —19—, said handles being provided with thumb-screws —20— for engaging the guides —19— and holding the wind-shield in its adjusted position.

What we claim is:

1. An attachment for wind shields comprising a horizontal bar adapted to rest upon the top rail of the shield, opposite upright bars attached to the ends of the horizontal bar and extending downwardly therefrom, and having their lower ends spring pressed against the lower edges of the shield, said bars constituting a frame, and a supplemental shield mounted on the frame to swing toward and from the main shield.

2. An attachment for wind shields comprising a frame having lower and upper upright bars slidable endwise one upon the other, means on the lower bar for engaging the lower edge of the wind shield, means attached to the upper bar for engaging the top rail of the wind shield, a spring for moving said parts in one direction to clamp them upon the wind shield, a supplemental shield mounted upon said frame to swing toward and from the main shield, and means for holding the supplemental shield in its adjusted position.

3. The combination with a main wind-shield section, of a supplemental shield frame having a lengthwise bar resting upon the upper edge of said section, upright bars each composed of sections slidable one upon the other, one of the bar sections being engaged with the lengthwise bar, the other bar section being engaged with the lower edge of the shield section, and a spring connecting said bar-sections for the purpose described, and a supplemental shield hinged to said frame.

In witness whereof we have hereunto set our hands this 15th day of May, 1918.

HARRY GOLDSMITH.
JOHN T. FUNDA.

Witnesses:
H. E. CHASE,
SYBIL WARNER.